(No Model.)
J. R. DAVIS.
WHIFFLETREE HOOK.
No. 333,837. Patented Jan. 5, 1886.
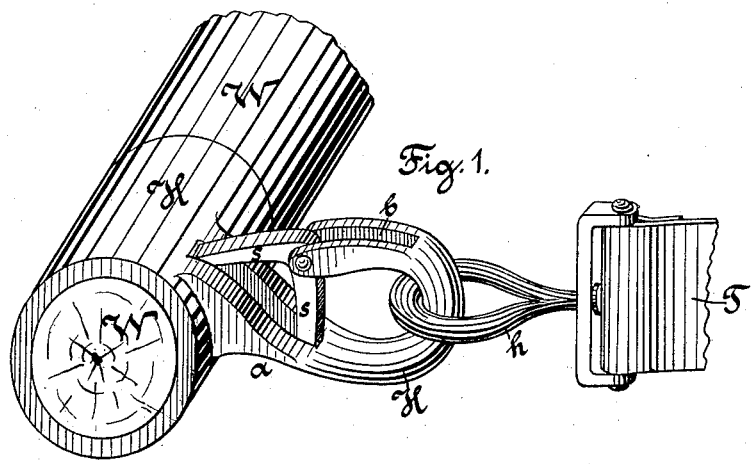
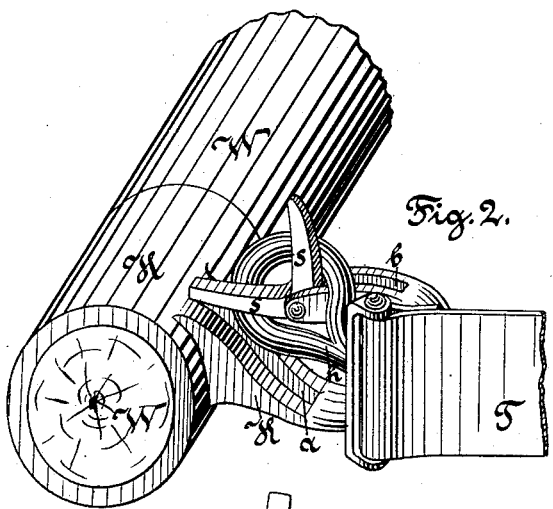
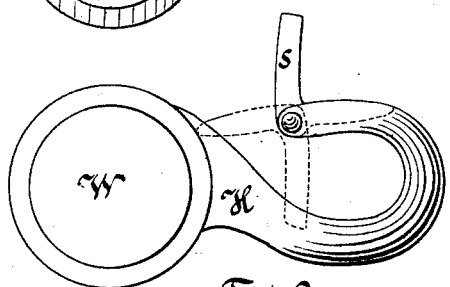
WITNESSES:
INVENTOR
John R. Davis.
BY
P. H. Perkins
ATTORNEY

UNITED STATES PATENT OFFICE.

JOHN R. DAVIS, OF BRISTOL, WISCONSIN.

WHIFFLETREE-HOOK.

SPECIFICATION forming part of Letters Patent No. 333,837, dated January 5, 1886.

Application filed November 7, 1885. Serial No. 182,121. (No model.)

*To all whom it may concern:*

Be it known that I, JOHN R. DAVIS, a citizen of the United States, residing at Bristol, in the county of Dane and State of Wisconsin, have invented certain new and useful Improvements in Whiffletree-Hooks; and I do hereby declare the following to be a full, clear, and exact description of the invention, such as will enable others skilled in the art to which it pertains to make and use the same.

The advantages secured by the use of my device are facilities for quickly and conveniently hooking to or detaching the trace-hook from the whiffletree-hook, and, further, of securing said trace-hook when thus attached to the whiffletree-hook, so that it will be impossible to disengage the same from said whiffletree-hook by any of such accidental causes as are apt to effect such result in all contrivances of this kind. I attain these objects by the mechanism illustrated in the accompanying drawings, in which—

Figure 1 is a plan view of my invention, showing a portion of the whiffletree with harness-trace attached. Fig. 2 is also a plan view, showing the essential feature of my invention, being the means by which I prevent any accidental unhooking of the trace-hook. Fig. 3 is a side view of my whiffletree-hook, the trace-hook being disconnected.

Similar letters, where they occur, refer to similar parts throughout the several views.

The hook and ferrule are made in one single piece, preferably a casting, the former extending forward, preferably at right angles to the latter. This part, consisting of the hook and ferrule, I designate by the letter H, and as there are two of these parts for every whiffletree—one for each end—they must be constructed or cast with reference to "rights" and "lefts."

Although I have shown the outside surface of the ferrule part as a plain cylinder, yet, if desired, for the purpose of greater strength the shank of the hook part may be extended in a rib or flange around the ferrule. The shank of the hook is slotted laterally at $a$, as also the upper limb of the same at $b$, for purposes which will be hereinafter explained.

The slotted end of the upper limb of the hook H terminates in a jaw, in which is permanently swiveled a V-shaped stop, $s$, adapted to swing or revolve freely on the bolt passing through the sides of said jaw. The lower limb of the stop $s$ is made somewhat the heavier of the two, so that the natural tendency when free will be for it to fall into and remain in the position shown in Fig. 1. The longitudinal slot $a$ is adapted to admit the free passage of the ends of said V-shaped stop, and terminates at its forward end in a shoulder, which limits the movements of the lower limb in that direction, as shown in Fig. 1. The extent of its motion in the opposite direction is shown in Fig. 3. In this last-named position the slot $b$ freely admits the upper limb of the stop $s$, which fills the same flush with the upper surface of the hook.

I will now proceed to explain how my device operates. Suppose the harness-trace T is to be attached. The stop $s$ is revolved to and held in the position shown in Fig. 3. The trace-hook $h$ is then passed over the upward-extending limb of $s$, and so on over the upper limb of the hook H, when it will fall into the proper draft position. At the same time the stop $s$, being released, drops into its normal position, the relative positions of all the parts being shown in Fig. 1. Now, the trace cannot be unhooked until the stop is brought back to the position shown in Fig. 3, when an operation the reverse of that just described will be necessary to unhook it. The hook $h$ can only be disengaged by passing it over the upper limb of the hook H. If, as may occasionally happen, the trace-hook $h$ slips up over the upper limb of H, it will strike the lower limb of the stop $s$. The limit of its motion in this direction is practically shown in Fig. 2. The spread of the limbs of the stop $s$ is such that the trace-hook $h$ cannot be drawn over them; hence it will be impossible for the harness-trace to unhook itself.

What I claim, and desire to secure by Letters Patent, is—

1. The combined ferrule and hook H, said hook being provided with longitudinal slots

*a* and *b*, adapted to admit and hold in position the V-shaped stop *s*, substantially as described, and for the uses and purposes mentioned.

2. The ferrule and hook H, in combination with the stop *s*, substantially as described, and for the uses and purposes mentioned.

In testimony whereof I have signed this specification in the presence of two subscribing witnesses.

JOHN R. DAVIS.

Witnesses:
C. A. NYE,
R. M. LAVALLETTE.